United States Patent Office 3,426,126
Patented Feb. 4, 1969

3,426,126
PROCESS FOR THE CONTROL OF NEMA-
TODES USING PETROLEUM OIL AND
WATER EMULSIONS
Gerald Thorne, Madison, Wis., and Allen F. Millikan,
Crystal Lake, Ill., assignors, by mesne assignments, to
The Union Oil Company of California, Los Angeles,
Calif., a corporation of California
No Drawing. Filed Oct. 31, 1963, Ser. No. 320,524
U.S. Cl. 424—170                                17 Claims
Int. Cl. A01n 9/04, 21/00

ABSTRACT OF THE DISCLOSURE

The invention comprises a method for the control of nematode infestation of plants which comprises contacting the plant and, preferably, the roots thereof with a non-phytotoxic emulsion of a petroleum oil in water. Suitable petroleum stocks include kerosene, diesel fuel, Stoddard solvent, cycle stock, furnace oil, range oil, lubricating oil, solvent extracts, residual oil, mineral fuel oil and mixtures thereof. A highly suitable material comprises a mixture of cycle stock and residual fuel oil which is used as an aqueous emulsion containing from 0.1 to 6.0 weight percent of the oil in the oil and water emulsion. Stability of the emulsion can be promoted by use of various conventional emulsifying agents. A particular application is the control of nematodes in flowering plants, and in particular in crysanthemums.

DESCRIPTION OF THE INVENTION

This invention relates to a method of treating plants for the purpose of controlling infestation of Aphelenchids and more particularly to a method of destroying nematodes belonging to the genus Aphelenchoides, which are known to infest chrysanthemums and other floral plants and also strawberry and other food plants, by application to the plant as by dipping of an oil-in-water emulsion containing about 0.1 to about 6.0% by weight of a hydrocarbon of the group consisting of kerosene, diesel fuel, Stoddard solvent, cycle stock, furnace oil, range oil, lubricating oil fractions, extracts from solvent refining of oil, residual oil, mineral seal oil, or mixtures of these hydrocarbons. It has been found, in accordance with this invention, that such application is lethal to the Aphelenchids resident in or on plant tissue and the treatment contributes greatly to the plant vitality and productivity.

It is known in the art that *Aphelenchoides ritzema-bosi* may be effectively controlled in infected chrysanthemum plants that are planted in soil that had been previously treated with oil. Other references discuss the economic importance of Aphelenchids without disclosing means for their control. At the present time the only known commercially effective treatment for Aphelenchids is the application of Parathion, which is one of the most deadly treatments known to man and repeated applications are necessary during the growing season. It would be, in many instances, dangerous to use this poison for the control of nematodes in food plants.

In general the control of nematodes is a difficult and perplexing problem. Nematodes belonging to the genus Aphelenchoides are notoriously destructive of many floral and food plants of economic importance. Among the major plants pests which belong to this genus are: *A. kuehnii* which infests clematis; *A. frageriae* which infests strawberry plants, anemones, begonias, chrysanthemums, coleuses, primulas, violets, Easter lilies, ferns, ranunculus, and other ornamentals; *A. besseyi* which infests strawberry plants and rice; *A. ritzema-bosi* which infests chrysanthemums, gooseberry plants, gloxinias, strawberry plants, lupines, and other ornamentals; and *A. subtenuis* which infests narcissus bulbs. An indication of the economic importance of Aphelenchid pests is provided by the following quotation concerning *A. ritzema-bosi*: "In certain years, like for instance in 1927, this species has destroyed in Berlin ⅓ to ¼ of all the flowers in horticulture." (From "A Manual of Agricultural Helminthology," I. N. Filipjev and J. H. Schuurmans-Stekhoven, Jr., Editors, (1941).)

In accordance with this invention and as a principal object thereof a new and effective one-application treatment has been discovered that controls nematodes for a complete season which comprises dipping infected plants in an oil-in-water emulsion containing effective amounts of a particular hydrocarbon oil or oil fraction or by-product as defined herein.

Another object of this invention is to provide a method for controlling nematodes belonging to the genus Aphelenchoides by treatment by dipping or direct contact of infected plants of an oil-in-water emulsion containing about 0.1 to about 6.0 percent by weight of an oil of the group consisting of kerosine, diesel fuel, Stoddard solvent, cycle stock, furnace oil, lubricating oil fractions, extracts from solvent refining of lubricating oils, residual oil, or mixtures thereof.

Another object of this invention is to provide a method for the control of chrysanthemum clumps infected with *Aphelenchoides ritzema-bosi* by dipping same in an emulsion containing about 1 part of an emulsifiable oil consisting essentially of about 71 weight percent of cycle stock, 24 weight percent residual fuel oil, and about 5 weight percent of an emulsifier with about 40 parts of water.

Another object of this invention is to provide a method of controlling chrysanthemum clumps infected with *Aphelenchoides ritzema-bosi* by treatment with about one part of an emulsifiable oil consisting of about 71 weight percent of cycle stock, 24 weight percent residual fuel oil, and about 5 weight percent of an emulsifier with about 80 parts of water. The emulsifier is preferably from the class of non-ionics which includes glyceryl mono-, di-, and tricarboxylates, glycol mono- and dicarboxylates, polyglycol mono- and dicarboxylates, and polyglycol mono-esters of alkylphenols.

These and further objects of the invention will become apparent as the specification proceeds.

In order to demonstrate the effectiveness of the method of this invention in controlling nematodes and also demonstrate that the treatment, surprising enough, is not phytotoxic to plants the following examples are given:

Example I

An emulsifiable oil was prepared using the following components:

71 weight percent #3 cycle stock (physical tests tabulated below)
24 weight percent #6 residual fuel oil (sample No. 4, Table VIII)
5 weight percent CPH–30 emulsifier (polyethylene glycol 400 monolaurate).

Twelve divisions of wintered-over chrysanthemum clumps that were severely infested with *Aphelenchoides ritzema-bosi* in 1961 were dipped in an emulsion containing 1 pt. of the above emulsifiable oil in 5 gals. of water (approximately 2½% oil) on June 9, 1962. The plants were then planted in a flat containing soil believed to be free of *A. ritzema-bosi*. On June 16, 1962 the plants were observed and eight were healthy and the remaining ones had obviously suffered a considerable setback as they had lost most of their leaves. Two weeks later all plants were alive and healthy although those that had lost leaves were a little retarded.

TABLE. I.—Tests on #3 cycle stock (#3 industrial distillate)

| | |
|---|---|
| Ramsbottom carbon residue | 0.54 |
| P.M. flash °F | 196 |
| A.P.I. gravity | 28.9 |
| Odor | Good |
| Pour point °F | 0 |

ASTM DISTILLATION (°F.)

| | |
|---|---|
| IBP | 411 |
| 5% | 445 |
| 10% | 460 |
| 20% | 478 |
| 30% | 492 |
| 40% | 504 |
| 50% | 516 |
| 60% | 530 |
| 70% | 545 |
| 80% | 562 |
| 90% | 586 |
| 95% | 606 |
| EP | 628 |
| Rec percent | 98.3 |
| Res do | 1.7 |
| Loss do | 00 |

HYDROCARBON ANALYSIS (FIA Method)

| | |
|---|---|
| Naphthenes+paraffins vol. percent | 51 |
| Olefins do | 5 |
| Aromatics do | 44 |
| Total sulfur wt. percent | 0.98 |

Example II

Ten divisions of wintered-over chrysanthemum clumps that were severely infested with *A. ritzema-bosi* in 1961 were dipped on June 16, 1962, in an emulsion containing ¼ pt. of the emulsifiable oil of Example I in 2½ gals. of water (approximately 1¼% oil). The plants were then planted in a flat containing soil believed to be free of *A. ritzema-bosi*. The plants never appeared to suffer any phytotoxic effects and tests for *A. ritzema-bosi* were negative.

Example III

Six divisions of a foliar nematode-invested chrysanthemum clump were given the dip treatment of Example I and are then planted in 4' x 4' plot on June 1. Six more divisions of the same clump are then planted without the dip treatment in an adjoining 4' x 4' plot at the same time. Both plots are watered daily during the growing season. In September the treated plants are healthy and free of foliar nematodes while the control plants are sickly and nearly dead from severe infestation by the foliar nematode.

To make the oil-in-water emulsions used in accordance with this invention, about 1 part of an emulsifiable oil (as illustrated in Table VIII) is mixed with from about 100 parts of water (to make an emulsion containing about 1.0% by weight of oil) to about 16 parts of water (to make an emulsion containing about 6.0% by weight of oil). Any of the known methods of compounding emulsions can be used whereby the emulsifiable oil is mixed with water (free of interfering salts). Where undiluted heavy oils are used, as for example, the lubricating oils or solvent extracts, some heating and agitation will be necessary to prepare the emulsions.

The emulsifier can be any surfactant, detergent or wetting agent which is not injurious to plants and is capable of emulsifying oil in water at oil concentrations of about 1% to about 6.0% by weight. A large group of such materials are available and known to the art. This invention is not to be limited to any particular non-phytotoxic emulsifier and other known emulsifiers than those named herein as examples which are not injurious to plants can be used. A partial disclosure of such emulsifiers known in the art by their trade or proprietary names includes Aerosol 18, N-octadecyl sulfosuccinamate; Aerosol 22, tetrasodium N-(1,2-dicarboxyethyl)-N-octadecyl-sulfosuccinamate; Aerosol AY, diamyl sodium sulfosuccinate; Aerosol OS, sodium isopropyl naphthalene sulfonate; Aerosol MA, dihexyl sodium sulfosuccinate; Aerosol OT, sodium dioctyl sulfosuccinate; Atlas G-1045, polyoxyethylene sorbitol pentalaurate; Atlas G-1086, and G-1096, polyoxyethylene sorbitol hexaoleate; Brij 35, polyoxyethylene lauryl ether; Brij 72, polyoxyethylene stearyl ether; Brij 96, polyoxyethylene (10) oleyl ether; CPH-43, polyoxyethylene glycol 600 monolaurate; Emulphor EL-620, polyoxyethylated vegetable oil; Emulphor ON-870, polyoxyethylated vegetable oil; Lubrol MOA, fatty alcohol ethylene oxide condensate, Siponate DSIO, sodium dodecyl benzene sulfonate; Renex 648 and 697, ethylene oxide nonylphenol condensation products, Span 60, sorbitan monostearate; Tween 80, polyoxyethylene sorbitan monooleate; Span 20, sorbitan monolaurate; Tween 20, polyoxyethylene sorbitan monolaurate; the Armeens, i.e., Armeen 8, octyl amine; Armeen 10, decyl amine; the Armacs, such as Armac HT or Armac 18, the acetate salt of octadecyl amine; Triton X-15, iso-octyl phenoxy ethanol; Triton X-35, iso-octyl phenoxy di-ethoxy ethanol, and the like.

Another class of nonionic emulsifiers are the proprietary products known under the name of Igepal, i.e., Igepal CA-210, CA-630, CA-720, CA-620, CO-887, alkyl phenoxy polyoxyethylene ethanols. Igepal CO-210, phenoxy polyoxyethylene ethanol; Igepal CO-430, CO-630, alkylphenoxy polyoxyethylene ethanols. These products have the formula

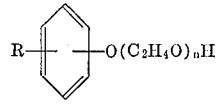

where R is $C_8$ to $C_{12}$ alkyl and $n$ is an integer from 3 to 20. Obviously the emulsifier can be of the anionic, cationic or nonionic types.

By way of illustration the following esters from a preferred class of nonionic emulsifiers for use in the o/w emulsions of the invention.

Glyceryl:
  Mono oleate
  Mono stearate
  Mono laurate
  Mono ricinoleate
  Di oleate
  Di stearate
  Di laurate
  Tri oleate
Diethylene glycol:
  Mono oleate
  Mono stearate
  Mono laurate
  Mono ricinoleate
  Di oleate
  Di stearate
  Di laurate
Propylene glycol:
  Mono oleate
  Mono stearate
  Mono laurate
  Mono ricinoleate
  Di oleate
  Di stearate
  Di laurate
Polyethylene glycol 300:
  Mono oleate
  Mono stearate
  Mono laurate
  Di oleate
  Di stearate
  Di laurate Polyethylene glycol 400:
  Mono oleate
  Mono stearate
  Mono laurate
  Di oleate
  Di stearate
  Di laurate
Polyethylene glycol 600:
  Mono oleate
  Mono stearate
  Mono laurate
  Di oleate
  Di stearate
  Di laurate
Polyethylene glycol 1000:
  Mono esters
  Di esters
Ethylene glycol:
  Mono oleate
  Mono stearate
  Mono laurate
  Mono ricinoleate
  Di oleate
  Di stearate
  Di laurate
Diglycol:
  Oleate
  Stearate
  Laurate
  Ricinoleate
Polyethylene glycol 200:
  Mono oleate
  Mono stearate
  Mono laurate
  Di oleate
  Di stearate
  Di laurate
"Carbowax" mono esters
"Carbowax" di esters
Methoxyethylene glycol esters Polyethylene glycol 400 monolaurate is a proprietary product known as CPH-30, used to illustrate this invention. This ester type surface active agent is a non-ionic (water soluble, oily liquid, of light amber color, having a slight fatty odor exhibiting the following typical analysis:

TABLE II

| Characteristic | Value |
|---|---|
| Saponification No. | 86–98 |
| Acid No., max. | 5.0 |
| Solidfying point, ° C. | 5–11 |
| Specific gravity, approx. 1,035 at 20° C. | |
| Weight, lbs./gal. | 8.63 |

The primary active ingredient in the oil-in-water emulsions of this invention is a member of the group consisting of kerosene, diesel fuel, Stoddard solvent, cycle stock, furnace oil, range oil, lubricating oil fractions, solvent extracts from the solvent refining of mineral lubricating oil using a solvent selective for aromatic compounds, residual oil, mineral seal oil and mixtures thereof. Each of these ingredients is defined as follows:

Kerosene.—Any refined petroleum distillate or fraction boiling between gasoline and gas oil, i.e., boiling between about 150° to 300° C. (302°–572° F.) having burning and illuminating properties. This product, in general, may meet the following specifications:

TABLE III

| Characteristic | Value |
|---|---|
| A.P.I. gravity | 41–46 |
| I.B.P., ° F. | 340–380 |
|   10% rec'd., ° F. | 370–410 |
|   50% rec'd., ° F. max. | 450 |
|   90% rec'd., ° F. max. | 500 |
| E.P., max. | 525–550 |
| Sulfur, percent max. | 0.13 |
| Color Saybolt, min. | +23–+25 |
| Odor | Good |
| Doctor | Neg. |
| TCC flash, ° F. | 120–150 |
| Cloud, ° F. max. | −10 |
| Burning test (24 hrs.) | Pass |
| Thermoviscosity | 375–450 |

By range oil is meant any distillate of petroleum having the following specifications:

TABLE IV

| Characteristic | Value |
|---|---|
| A.P.I. gravity, ° C. | 40–46 |
| I.B.P., ° F. | 340–370 |
|   10% rec'd., max. | 390 |
|   50% rec'd., max. | 450 |
|   90% rec'd., max. | 510 |
| E.P. | 540–560 |
| Percent sulfur, max. | 0.5 |
| Saybolt color, min. | 18 |
| Odor | Good |
| Doctor | Negative |
| TCC flash, ° F. min. | 115 |
| Pour, max. | −30 |

One particular range oil useful in accordance with this invention contained 0.15% by weight of sulfur and exhibited a pour point of −30° F. in addition to meeting the remaining specifications.

Cycle stock.—Comprises industrial distillates having, in general, the following characteristics:

TABLE V

| Characteristic | Value |
|---|---|
| A.P.I. gravity | 27–30 |
| I.B.P., ° F. | 390–440 |
|   10% rec'd, ° F. max. | 490 |
|   90% rec'd, ° F. max. | 600 |
| E.P., ° F. max. | 630 |
| Percent rec., min. | 98 |
| Wt. percent sulfur, max. | 1.2 |
| ASTM, max. | 3 |
| Carbon residue (10% bottoms), max. | 0.5 |
| Odor | Good |
| PM flash, ° F. min. | 150 |
| Pour point, ° F. max. | 5 |

The furnace oil used in accordance with this invention may be any petroleum distillate having burning qualities which meets, in general, the following characteristics:

TABLE VI

| Characteristic | Value | |
|---|---|---|
| | No. 1 furnace oil | No. 2 furnace oil |
| A.P.I. gravity (deg.) | 40–46 | 30–39 |
| I.B.P., ° F. | 340–380 | 370–400 |
|   10% rec'd (max.) | 414 | 440 |
|   90% rec'd | 500–520 | ¹ 630 |
| E.P. | ¹ 570 | 660 |
| Saybolt color | +10 to +20 | ¹ 4 |
| C.R. (10% bottoms) (max.) | 0.15 | 0.25 |
| Odor | Good | Good |
| PM flash (° F.) | 125–150 | 130–180 |
| TCC flash (° F.) | 115–145 | |
| Pour point (max.) | 0° | 0° |

¹ Maximum.

Lubricating oil.—The lubricating oil used as an ingredient of the composition of this invention can be any fraction of crude petroleum which exhibits lubricating properties. The lubricating oil may be solvent refined or conventionally refined or unrefined. In general, lubricating oils useful in accordance with this invention will have A.P.I. gravities ranging from about 20° to 36° and flash points of about 400° to about 600° F. and viscosities at 100° F. of about 150 to 2500 SUS.

The properties of individual fractions of various species of neutral, high VI neutrals, bright stocks, intermediate VI bright stocks and high VI bright stocks, taken as fractions from base lubricating oils in the process of further refinement for special purposes may have characteristics outside the foregoing general range. Some of these refined lubricating oils are illustrated in the table on hydrocarbon specifications. The lubricating oil fractions useful in accordance with this invention are, in general, those lubricating oils derived from paraffin base crude, asphalt base crude or naphthene base crude, or mixed base crude, i.e., those of Mid-Continent origin. The lubricating oil may be derived by distillation or from the treatment of residual fractions by various processes known in the art.

Another unique source of active ingredients for the oil-in-water emulsions of this invention comprises petroleum fractions rich in complex, polynuclear aromatic hydrocarbons as illustrated by the class of materials known as solvent extracts obtained in the solvent extraction of mineral lubricating oils using a solvent selective for aromatic compounds. The selective solvent removes as the extract phase the complex, polynuclear, aryl, alkaryl, condensed ring and heterocyclic compounds (containing heterocyclic rings of sulfur, nitrogen and oxygen) which are considered deleterious to lubricating purpose, that is, those materials which are unstable, viscous, have low viscosity indices and low resistance to oxidation. Under the adverse conditions of lubricating an internal combustion engine, the ingredients in solvent extracts, are generally believed to attribute to sludge formation. One of the purposes of solvent extraction is to remove the sludge-forming materials as one step in the preparation of refined and stable lubricating oils. The treatment of distillates produces neutral lubricating oils and the treatment of vacuum residuals produces so-called bright stocks. Solvent extracts from either source are useful in accordance with this invention.

Since the general process of solvent refining mineral lubricating oils is well known and the solvent extracts obtained thereby are likewise well known, same being described in numerous literature articles, text books, issued United States patents, i.e., 2,875,170, 3,056,773, 3,037,877, 2,968,619, 3,014,867, 2,963,424, 2,878,181, 2,910,440 and 2,890,172, it is only necessary to set forth the characteristics of a number of illustrative species:

The molecular weight, weight percent of sulfur and average number of aromatic rings per mean aromatic molecule are used to characterize the solvent extracts for purposes of this invention. Chemically Solvent Extracts Nos. 19, 21, 43 and 44, used to illustrate the invention more specifically, contain about 12.5 weight percent of mononuclear aromatics (substituted benzenes), about 30 weight percent of dinuclear aromatics (substituted naphthalenes), about 10 weight percent of substituted phenanthrenes and 5 weight percent of substituted anthracenes and minor percentages of tetranuclear aromatics (substituted chrysenes, benzphenanthrenes and pyrenes) along with pentanuclear aromatics, i.e., perylene. The solvent extracts used to illustrate this invention have average molecular weights of about 375 to 450, contain 2 to 5 alkyl substituents per molecule wherein the sum of the carbon atoms in the alkyl or cycloalkyl side chains is about 10 to 22 and contain about 1.9 to 4.5% total combined sulfur, 0.04 to 0.91% by weight of nitrogen and similar amounts of oxygen in the form of heterocyclic rings.

The mineral seal oil is higher boiling fuel oil fraction, having burning qualities (ASTM D239-30) so designated because of its long time burning qualities, and freedom from burning deposits. Such an oil has an A.P.I. gravity of about 34 to 36°, I.B.P. about 490° F., E.P. about 650° F.

The residual oil is obtained by vacuum distillation of typical crude oil, is dark to black in color, has an A.P.I. gravity of 10 to 15°, is viscous and has a high carbon residue. In a typical operation a topped crude having an A.P.I. gravity of 19.7°, flash of 389° F., +25° F. pour point, 100.1 SUS viscosity at 210° F., I.B.P. 520° F., E.P. 733° F. is subjected to vacuum distillation in a tower operated at a flash-zone temperature of about 705° F. under absolute pressure of 90 mm. mercury with flash steam in amount of about 0.7 lb./bbl. of charge to produce a vacuum residual oil having an A.P.I. gravity of about 12.6°; flash 575° F.; vis. SUS at 210° F. of 1300; color, black and carbon residue (Conradson) of 13.5%

TABLE VII.—SOURCES AND PHYSICAL CHARACTERISTICS OF SOLVENT EXTRACTS

| Ext. No. | Crude Source | Solvent | API Grav. | Sp. Gr. at 10° F. | Vis./ 100° F. | Vis./ 130° F. | Vis./ 210° F. | V.I. | Pour | °F. flash | °F. fire | Iodine No. (Wijs) | Percent C.R. | Percent sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.88 |
| 9 | Santa Fe Springs. | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane-cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | 55 | 70 | | | | | 1.1 | 2.75 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 vis. neutral, has an average molecular weight of 300, and contained 76.8% aromatics (by the silica jel procedure).

Extract No. 42 was obtained in the production of 150 vis. bright stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 vis. neutral, has an average molecular weight of 340, contained 87.0% aromatics, 13% saturates, analyzed 86.4% carbon, 10.7% hydrogen, and averaged 2.7 aromatic rings per aromatic molecule.

Extract No. 44 was obtained in the production of 200 vis. neutral, has an average molecular weight of 340 and contained 87% aromatics and 13% saturates.

Extract No. 45 was obtained in the production of 160 vis. bright stock and contained 92% aromatics and 8% saturates.

by weight. This product is illustrative of residual oil suitable for use in this invention. In practice, residual oils are generally mixtures of residual products from various processes blended together to qualify as a No. 6 fuel oil (heavy such as sample No. 4 in Table VIII, also used in Example I.

Table VIII shows the specifications of several examples of hydrocarbons of petroleum origin to illustrate species of the group of materials found to function in accordance with this invention.

TABLE VIII.—HYDROCARBON SPECIFICATIONS

| Sample No. | Material | API Grav. | Color Say. | IBP | 5% | 10% | 30% | 50% | 70% | 90% | E.P. | Acidity |
|---|---|---|---|---|---|---|---|---|---|---|---|---|
| 1 | Stoddard solvent | 48.7 | +30 | 312 | | | 323 | 334 | | 357 | 394 | Negative. |
| 2 | do | 53.0 | +30 | 315 | 321 | 323 | 328 | 335 | 343 | 358 | 382 | Neutral. |
| 3 | Cycle Stock (No. 3 Ind. distillate). | 30.1 | | 368 | | 440 | | 508 | | 586 | 636 | Negative. |
| 4 | Furnace oil (No. 6 residual fuel oil). | 11.1 | ASTM | | | | | | | | | Do. |
| 5 | No. 1 diesel fuel oil (range oil). | 42.6 | +24 | 344 | 370 | 382 | 409 | 429 | 453 | 486 | 518 | |
| 6 | do | 41.4 | +24 | 350 | | 372 | | 428 | | 520 | 560 | |
| 7 | No. 2 fuel oil | 32.3 | ASTM | 380 | | 420 | | 494 | | 566 | 620 | |
| 8 | No. 1 diesel fuel | 42.5 | +26 | 356 | | 393 | | | | 482 | 522 | |
| 9 | No. 2 diesel fuel | 35.8 | L2.0 | 385 | | 425 | | | | 576 | 620 | |
| 10 | No. 2 fuel oil | 35.6 | L-1 ASTM | 368 | 422 | 438 | 474 | 505 | 526 | 580 | 612 | |
| 11 | Kerosene | 44.7 | 27 | 336 | | 362 | | 406 | | 460 | 502 | |
| 12 | Mineral seal oil | 34.7 | L1.0 | 498 | | | | 536 | | 622 | 648 | |
| 13 | No. 1 fuel oil | 40–42 | ¹19 | 350–380 | | 420 | | | | | 520 | |
| 14 | do | 41–44 | ¹+21 | ¹320 | | ²410 | | | | | ²540 | |
| 15 | No. 2 diesel fuel | 38–40 | ²1 NPA | ¹350 | | 450–480 | | | | 540–600 | 600–640 | |
| 16 | do | 32–36 | 0.5–2.0 NPA | 350–400 | | ²450 | | | | 540–600 | | |
| 17 | Kerosene | 42–44 | ¹+25 | 350–380 | | 380–410 | | ¹415 | | ²500 | ²525 | |
| 18 | do | 41–44.5 | ¹+25 | 330–360 | | 370–410 | | ²450 | | ²500 | ²500 | |
| 19 | do | 43.0 | ¹+27 | 360 | 390 | 403 | 425 | 448 | 466 | 497 | 532 | |
| 20 | Stoddard solvent (mineral spirits). | 49.2 | +30 | 313 | 320 | 323 | 330 | 338 | 347 | 364 | 386 | Neutral. |
| 21 | No. 1 diesel fuel | 34.5 | L1.0 | 405 | 436 | 450 | 481 | 517 | 534 | 567 | 608 | |
| 22 | No. 5 residual fuel | ²14.0 | Black | | | | | | | | | |
| 23 | do | | Black | | | | | | | | | |
| 24 | do | ²20.0 | Black | | | | | | | | | |
| 25 | No. 6 residual fuel | ²16.0 | | | | | | | | | | |
| 26 | do | ²13.0 | | | | | | | | | | |
| 27 | do | ²12.0 | | | | | | | | | | |
| 28 | Mid. Cont. bright stock | 21/23 | | | | | | | | | | |
| 29 | Penn. bright stock | 26/27 | 6/7 ASTM | | | | | | | | | Neutral. |
| 30 | Gulf Coast lube oil | 21.2 | 6 ASTM | | | | | | | | | Do. |
| 31 | do | 21/22 | 2/3 | | | | | | | | | Do. |

¹ Minimum.   ² Maximum.

| Sample No. | Corr. | TCC flash | Percent S | C.R. | Vis./100 SUS | Cloud | Pour, °F. | Other characteristic |
|---|---|---|---|---|---|---|---|---|
| 1 | 1b | 104 | | | | | | 133.6 AP. |
| 2 | +2A | 107 | | | | | | |
| 3 | | | 0.83 | | | | 0 | |
| 4 | | | 0.70 | | 47.4 (at 122 SFS) | | 40 | |
| 5 | 1A | 134 | 0.069 | 0.02 | | Bel. −20 | Bel. −20 | |
| 6 | 1A | | 0.48 | | | | −35 | |
| 7 | 1A | | 0.78 | | | −8 | −5 | |
| 8 | 1A | 141 | 0.04 | 0.01 | 31.4 | | −20 | |
| 9 | 1A | | 0.20 | 0.01 | 34.6 | 0 | 0 | |
| 10 | 1A | | 0.101 | 0.02 | 36.0 | −5 | −10 | |
| 11 | | | 0.08 | | | | −55 | |
| 12 | | | | | | | | 285° F. COC. |
| 13 | | 120 min | 0.15 max | | 1.4–2.2 gs./100° F | | | |
| 14 | | 121–160 | 0.05 max | | 30–35 | | −20 max | |
| 15 | | 150 min. PM | 0.5 max | 0.2 max | | | 5 max | |
| 16 | | 150 min. PM | 0.35 max | 0.15 max | 34–35 | 10 max | 0 max | |
| 17 | | 120 min | 0.13 max | | | | | |
| 18 | | 125–150 | 0.10 max | | | | | |
| 19 | 1A+ | 149 | 0.047 | | | | −48 | |
| 20 | 2A+ | 105 | | | | | | Aniline Pt. 132.0° F. |
| 21 | 1A+ | 192 PM | 0.18 | 0.10 | 34.8 | 0 | −5 | |
| 22 | | 130 min. PM | 1.0 max | | 150 min | | 60 | Ash Oil max. |
| 23 | | 130 min | | | 150 min | | | Do. |
| 24 | | | 2.5 max | | 300 max | | 0 max | Do. |
| 25 | | 150 min | 3.0 max | | 300 max. SFS at 122° F | | 50 typical | H₂O and Sed. 1.0% max. |
| 26 | | 150 min. PM | 1.6–2.5 | | 45–200 SFS at 122° F | | 50 max | Sed. 25% max. |
| 27 | | 150 min. PM | .6 max | | 125–300 SFS at 122° F | | 50 max | H₂O and Sed. 2.0% max. |
| 28 | Neg | 530/540 | | | 155/165 at 210° F | | 20/25 | |
| 29 | Neg | | | | 130/140 at 210° F | | 10/15 | |
| 30 | Neg | | | | 200/210 | | −20/−25 | |
| 31 | Neg | 350/360 | 0.035 | | 200/210 | | −25 | |

The odor of all samples is typical of these source materials and where applicable they are Doctor negative, i.e., Samples 1, 2, 5, 6, 8, 11, 13, 14 and 17–20.

In order to further demonstrate this invention, Table IX presents a number of examples of soluble oil compositions which are emulsifiable with water in various proportions to obtain about 1.0 to 3.0% by weight of hydrocarbon therein, as previously explained.

The plots were cultivated as necessary throughout the season. Except for a 3-week period around August 1, the plots were given a good soaking on all rainless days.

On September 29, the plots were observed and it was noted that the control plot had the shortest growth habit

TABLE IX.—WT. PERCENT OF COMPOSITION

| Ingredient | Number | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Kerosene | 71 | | | | 80 | | | | | | | | | 10 | | | | |
| Diesel fuel | 24 | | | | | 65 | 70 | | | | | | | 65 | | | | |
| Stoddard solvent | | 70 | | | | | | 65 | | | | | | | 62 | | | |
| Cycle stock | | 25 | | | | | | | | | | | | | | 55 | | |
| Furnace oil | | | 65 | | | | | | 70 | 67 | 72 | | | | | | | |
| Range oil | | | 30 | 70 | | | | | | | | 64 | 70 | | | | | |
| Solvent extract | | | | | | | | | | | | | | 10 | 30 | 5 | 20 | |
| Lubricating oil | | | | | | | | | | | | | | 26 | 10 | | 3.0 | 90 |
| Residual oil | | | | 24 | 14 | 32 | 23 | 30 | 25 | 29 | 22 | 31 | | | | | | |
| Mineral seal oil | | | | | | | | | | | | | | | | 30 | | |
| CPH-30 emulsifier-5 | 5.0 | 5.0 | 4.0 | 6.0 | 6.0 | 3.0 | 7.0 | 5.0 | 5.0 | 4.0 | 6.0 | 5.0 | 4.0 | 5.0 | 8.0 | 7.0 | 10.0 | 10.0 |

As heretofore stated, this invention contemplates, as part of the composition, any lubricating oil or lubricating oil fraction, from mineral lubricating oils, in either crude or refined form. Other suitable lubricating oil fractions are described in United States patents: 2,889,262 by C. A. Porter, D. G. Samuelson and L. W. Holm; 2,921,023 by L. W. Holm; 2,900,342 by A. A. Manteuffel, G. R. Cook and W. W. Curtiss; and 2,885,363 by G. Wolfram and J. B. Stucker, all assigned to the instant assignee. Table X gives the characteristics of additional refined and unrefined mineral lubricating oils that may be used as the active ingredient in the oil-in-water compositions of this invention.

and this was attributed to greater debilitation due to nematode disease. The tabulation below presents measured heights.

TABLE XI

| West | | | Control | | | East | | |
|---|---|---|---|---|---|---|---|---|
| 15" | 18" | 14" | 14" | 14" | 12" | 18" | 18" | 20" |
| — | 18" | 15" | 16" | 14" | 12" | 16" | 16" | 16" |
| Average 16" | | | Average 13.7" | | | Average 17.3" | | |

The embodiments of the invention in which an exclusive property or privilege is claimed are defined as follows:

1. The method of controlling the foliar nematode in-

TABLE X.—PROPERTIES OF MINERAL LUBRICATING OILS

| No. | Mineral oil | APT Grav. | COC flash | COC fire | Vis. at 100° F. SUS | Vis. at 210° F. SUS | VI | Pour ° F. | Color, NPA | Percent S | C.R. | Neut. No. |
|---|---|---|---|---|---|---|---|---|---|---|---|---|
| 1 | Non-viscous neutral MCSR oil | 36.6 | 370 | 405 | 71.3 | 36.7 | 111 | 0 | +1 | 0.18 | | |
| 2 | Gulf Coast oil | 22.6 | | | 106 | 38.6 | 34 | −40 | | | | |
| 3 | 160 Gulf Coast bright stock | 17.8 | 515 | 590 | 6,530 | 151.6 | −15 | +30 | +3½ | 0.40 | | |
| 4 | 200 Gulf Coast neutral | 22.8 | 355 | 390 | 207.3 | 43.5 | 21 | ¹ −30 | +3 | | | |
| 5 | 150 MCSR bright stock | 27.2 | 555 | 615 | 2,376 | 147 | 97 | +6 | +15 | 0.47 | | |
| 6 | 170 MCSR neutral | 30.4 | 400 | 460 | 170.5 | 44.2 | 93 | +20 | +2 | | | |
| 7 | 200 MC conv. refined neutral | 25.2 | 395 | 455 | 208.6 | 45.3 | 70 | +65 | +4 | 0.46 | | |
| 8 | Non-viscous MCSR neutral | 36.6 | 370 | 405 | 71.3 | 36.7 | 111 | 0 | +1 | 0.18 | | |
| 9 | 1120 MCSR oil | 24.8 | | | 1,623 | 118 | 98 | +15 | | | | |
| 10 | 200 MCSR neutral | 29.7 | 410 | 470 | 201 | 46 | 91 | +10 | +1½ | | | |
| 11 | 120 MCSR bright stock | 25.8 | 540 | 600 | 1,985 | 125.5 | 91 | +15 | +7 | | | |
| 12 | Heavy deasphalted oil | 22.9 | | | 2,900 | 165.6 | 96 | | | | 1.87 | 0.80 |
| 13 | Medium neutral distillate | 24.2 | | | 243.2 | 47.4 | 74 | | | 1.13 | 0.11 | 2.9 |
| 14 | Heavy deasphalted residium | 21.7 | | | | 177.2 | | | | 1.14 | 1.96 | 1.51 |
| 15 | Solvent refined neutral distillate | 34.0 | | | | | 90 | | | 0.12 | 0.01 | 0.15 |
| 16 | Finished bright stock | | 540 | | 119.2 | | 98.5 | 0 | | 0.26 | .03 | |

¹ Below.

Further confirmation of the beneficial results obtainable by the practice of this invention is demonstrated by the following example.

Example IV

On May 30, 1963, chrysanthemum plantings were made in three adjoining 4 ft. by 4 ft. plots of freshly cultivated soil on the south side of a building in Crystal Lake, Ill. The plantings, comprising six cuttings per plot and substantially equally spaced therein, utilized rooted cuttings purchased from a chrysanthemum nursery and were of the clone "Coppersmith," known to be notoriously susceptible to foliar nematode disease (caused primarily by the species *Aphelenchoids-ritzema-bosi*.

In the western plot, the six cuttings were dipped (before planting) in an emulsion prepared by mixing ½ pint of the emulsifiable oil described in Example I in 2½ gallons of water. Before planting in the eastern plot the six cuttings were dipped in an emulsion of 1 pint of the same emulsifiable oil in 2½ gallons of water. The central (control) plot was planted with six untreated cuttings.

The plots were observed about 48 hours after planting and one plant in the western plot was observed to have been cut off by a cutworm. Another plant had died in the same plot. All other plants in the three plots were healthy.

Within a few weeks the cutworm damaged plant grew from its roots into a healthy but slightly retarded plant.

festation of plants which comprises directly contacting said plants with a nematocidally effective amount of non-phytotoxic oil-in-water emulsion containing as the sole nematocide about 0.1 to 6.0 percent by weight of hydrocarbon of the group consisting of kerosene, diesel fuel, Stoddard solvent, cycle stock, furnace oil, range oil, residual oil, mineral seal oil, lubricating oil fractions, extracts from solvent refining of mineral lubricating oil, and mixtures thereof.

2. The method in accordance with claim 1 in which said hydrocarbon is cycle stock.

3. The method in accordance with claim 1 in which said hydrocarbon is residual oil.

4. The method in accordance with claim 1 in which hydrocarbon is a mixture of cycle stock and residual oil.

5. The method in accordance with claim 1 in which said hydrocarbon is solvent extract obtained in the solvent extraction of mineral lubricating oils.

6. The method of controlling the infestation of plants with nematodes of the genus Aphelenchoides which comprises directly contacting said plants with a nematocidally effective amount of non-phytotoxic oil-in-water emulsion containing as the sole nematocide about 0.1 to 6.0 percent by weight of hydrocarbon of the group consisting of kerosene, diesel fuel, Stoddard solvent, cycle stock, furnace oil, range oil, mineral seal oil, lubricating oil fractions, extracts from solvent refining of lubricating oils, residual oil and mixtures thereof.

7. The method in accordance with claim 6 in which said oil-in-water emulsion contains about 71 weight percent of cycle stock, about 24 weight percent of residual oil and about 5 weight percent of an emulsifier blended in a ratio of about 1 part per 16 to 100 parts of water.

8. The method of controlling the infestation of plants with nematodes of the genus Aphelenchoides which comprises dipping said plants in a non-phytotoxic oil-in-water emulsion containing as the sole nematocide about 0.1 to 3.0 percent by weight of hydrocarbon of the group consisting of kerosene, diesel fuel, Stoddard solvent, cycle stock, furnace oil, range oil, mineral seal oil, lubricating oil fractions, extracts from the solvent refining of mineral lubricating oil, residual oil and mixtures thereof, and thereafter planting said plants in soil free of said nematodes.

9. The method of controlling the infestation of chrysanthemum clumps with nematodes of the species *Aphelenchoides ritzema-bosi* which comprises directly contacting said plants with a nematocidally effective amount of non-phytotoxic oil-in-water emulsion containing as the sole nematocide about 0.1 to 3.0 percent by weight of hydrocarbon of the group consisting of kerosene, diesel fuel, Stoddard solvent, cycle stock, furnace oil, range oil, mineral seal oil, lubricating oil fractions, extracts from the solvent refining of mineral lubricating oils, residual oil and mixtures thereof.

10. The method of controlling the infestation of chrysanthemum clumps with nematodes of the species *Aphelenchoides ritzema-bosi* which comprises dipping said plants in a non-phytotoxic oil-in-water emulsion containing as the sole nematocide about 2.0 to 5.0 percent by weight of hydrocarbon of the group consisting of kerosene, diesel fuel, Stoddard solvent, cycle stock, furnace oil, range oil, mineral seal oil, lubricating oil fractions, extracts from the solvent refining of mineral lubricating oils, residual oil and mixtures thereof and thereafter planting said plants.

11. The method in accordance with claim 10 in which said emulsion contains about 2.5 weight percent of a mixture of cycle stock and residual oil.

12. The method of controlling the infestation of chrysanthemums by nematodes of the species *Aphelenchoides ritzema-bosi* which comprises dipping said chrysanthemum clumps in a non-phytotoxic oil-in-water emulsion containing as the sole nematocide about 0.1 to 6.0 percent by weight of an emulsifiable oil comprising about 71 weight percent of cycle stock, 24 weight percent of residual fuel oil and 5 weight percent of an emulsifier and thereafter planting said chrysanthemums in soil free of *Aphelenchoides ritzema-bosi*.

13. The method in accordance with claim 12 in which about one part of said emulsifiable oil is used per 40 parts of water.

14. The method in accordance with claim 12 in which one part of said emulsifiable oil is used per 20 parts of water.

15. The method in accordance with claim 12 in which said emulsifier is a non-ionic.

16. The method in accordance with claim 12 in which said emulsifier is polyethylene glycol 400 monolaurate.

17. The method in accordance with claim 12 in which the cycle stock boils between about 411° F. and 628° F., has an API gravity of about 28.9°, has a pour point of about 0° F., has a sulfur content of about 0.98 weight percent, and has a hydrocarbon content composed of about 51 volume percent paraffins and naphthenes, 5 volume percent olefins, and 44 volume percent aromatics, and said residual fuel oil has an API gravity of about 11.1° contains about 0.70 weight percent of sulfur, has a viscosity of about 47.4 at 122 SF and a pour point of about 40° F.

References Cited

UNITED STATES PATENTS

| 2,127,526 | 8/1938 | O'Kane | 167—27 |
| 2,696,453 | 12/1954 | Sanders et al. | 167—30 |
| 3,138,896 | 6/1964 | Millikan | 47—58 |

FOREIGN PATENTS 588,800  12/1959  Canada.

ALBERT T. MEYERS, *Primary Examiner.*

D. M. STEPHENS, *Assistant Examiner.*

U.S. Cl. X.R.

47—58; 424—171, 172, 355